United States Patent [19]

Usui et al.

[11] Patent Number: 4,615,173
[45] Date of Patent: Oct. 7, 1986

[54] EXHAUST EMISSION CONTROL APPARATUS FOR DIESEL ENGINE

[75] Inventors: Toshifumi Usui, Katsuta; Shozo Yanagisawa, Ibaraki, both of Japan

[73] Assignee: Hitachi, Ltd., Tokyo, Japan

[21] Appl. No.: 667,756

[22] Filed: Nov. 2, 1984

[30] Foreign Application Priority Data

Nov. 9, 1983 [JP] Japan .................. 58-210055

[51] Int. Cl.⁴ ............................................. F01N 3/02
[52] U.S. Cl. ..................................... 60/286; 55/283; 55/466; 55/DIG. 30; 60/303; 60/311
[58] Field of Search ................. 60/274, 286, 303, 311, 60/748, 39.76, 39.81; 55/DIG. 10, DIG. 30, 282, 283, 466, 523

[56] References Cited

U.S. PATENT DOCUMENTS

| | | | |
|---|---|---|---|
| 4,383,411 | 5/1983 | Riddel | 60/311 |
| 4,404,795 | 9/1983 | Oishi | 60/303 |
| 4,450,682 | 5/1984 | Sato | 55/DIG. 30 |

FOREIGN PATENT DOCUMENTS

| | | | |
|---|---|---|---|
| 3121274 | 12/1982 | Fed. Rep. of Germany | 60/303 |
| 72611 | 4/1983 | Japan | 60/286 |

Primary Examiner—Douglas Hart
Attorney, Agent, or Firm—Antonelli, Terry & Wands

[57] ABSTRACT

An exhaust emission control apparatus for a Diesel engine includes a filter collecting particulates contained in exhaust gases of the Diesel engine and a fuel supply device supplying fuel required for burning the collected particulates. The fuel supply device controls the amount of supplied fuel so that the temperature of the filter can be raised to a level high enough for burning the collected particulates but not so high as to damage the filter itself by the heat applied thereto. A control unit executes the fuel control on the basis of the temperature of the filter and the pressure drop across the filter.

13 Claims, 10 Drawing Figures

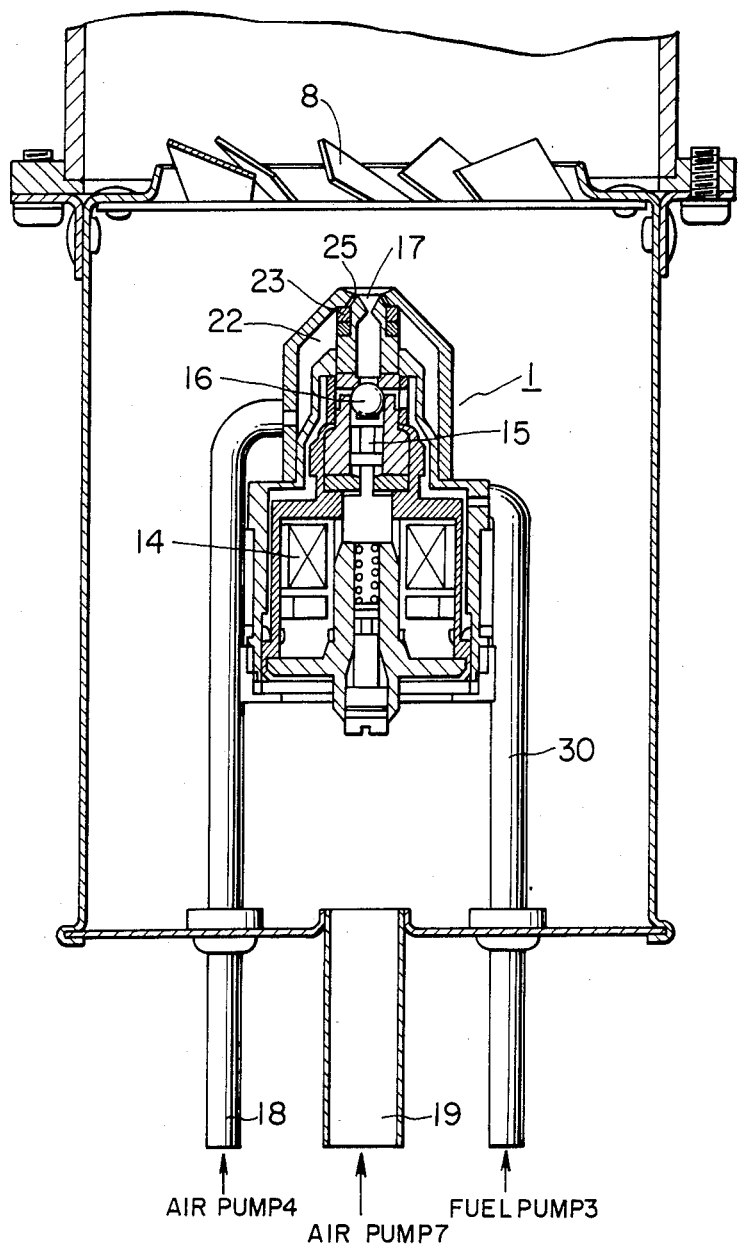

EXHAUST EMISSION CONTROL APPARATUS FOR DIESEL ENGINE

BACKGROUND OF THE INVENTION

This invention relates to an exhaust emission control apparatus for a Diesel engine, and more particularly to an apparatus of the kind above described which can regenerate a filter provided for collecting particulates contained in engine exhaust gases.

As means for minimizing emission of particulates contained in exhaust gases of a Diesel engine, an apparatus is known in which a filter is disposed in the exhaust pipe to collect the particulates, and a burner is provided for burning the collected particulates thereby reducing the pressure loss across the filter due to the presence of the collected particulates.

However, since the filter is usually made of a porous ceramic material capable of withstanding a high temperature of about 1,200° C. to 1,300° C., while, on the other hand, the combustion temperature of the particulates is about 500° C. to 600° C., the filter will be damaged by the heat generated from the burner when the heat of combustion exceeds 1,300° C. although the combustion of the particulates may be successfully attained.

In order to avoid damage to the filter due to the heat, it is necessary to control the fuel supply so that the combustion temperature of the particulates in the filter is maintained within the range of from 600° C. to 1,200° C., and the particulates only can be efficiently burnt. As means for controlling the fuel supply, a fuel control system including an air assist type burner as disclosed in Japanese patent application Laid-open No. 57-212317 (1982) has been proposed and has achieved a considerable success in practical use. However, proposed auto emission standard have set forth a target of a very high level in regard to the amount of particulates contained in exhaust gases of Diesel engines. Therefore, in order to achieve the target of the very high level set forth by the these standards the prior art fuel control system including the an air assist type burner, and using assist air at a predetermined pressure to control the pressure of fuel continuously supplied for combustion of particulates, has had limitations from the viewpoint of more accurate electronic control of the amount of fuel supply and also from the viewpoint of satisfactory atomization of fuel.

SUMMARY OF THE INVENTION

It is a primary object of the present invention to provide an exhaust emission control apparatus for a Diesel engine, which can electronically control the fuel supply with higher accuracy and can realize complete combustion of fuel by satisfactory atomization of fuel.

According to the present invention which attains the above object, fuel required for causing combustion of particulates collected in a filter is discontinuously supplied, and the duty determining the duration of fuel supply is electronically controlled so as to control the amount of fuel with higher accuracy. Also, according to the present invention, the fuel is emitted from a fuel jet nozzle, and an air assist is discontinuously supplied from a location in the vicinity of the nozzle for satisfactorily atomizing the emitted fuel.

BRIEF DESCRIPTION OF THE DRAWINGS

FIG. 2 is a schematic sectional view of part of the fuel supply device incorporated in the apparatus of the present invention.

DESCRIPTION OF THE PREFERRED EMBODIMENT

Figure 1:
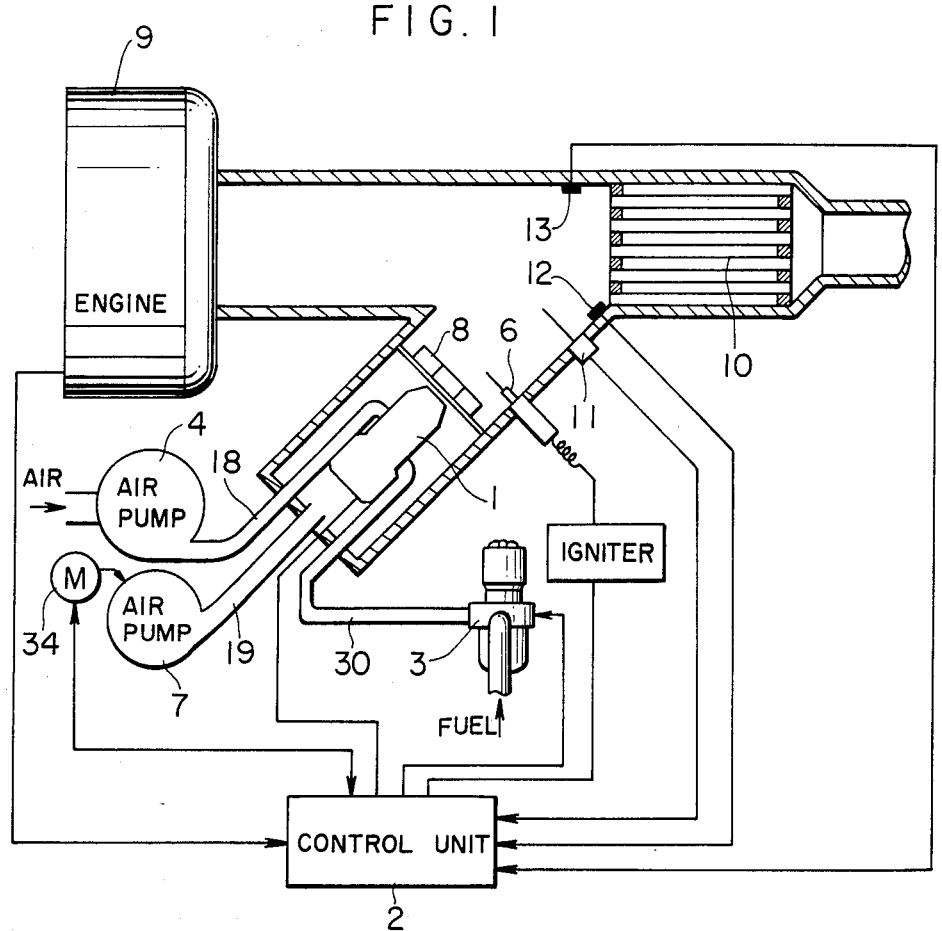
FIG. 1 is a diagrammatic view showing schematically the structure of an embodiment of the exhaust emission control apparatus according to the present invention.

FIG. 1 is a diagrammatic view showing schematically the structure of a preferred embodiment of the Diesel-engine exhaust emission control apparatus according to the present invention. Referring to FIG. 1, information of the operation parameters of an engine 9, such as the engine rotation speed and the amount of intake air, and information of the control parameters of a filter 10, including the outputs from a flame sensor 11, a temperature sensor 12 and a pressure sensor 13, are applied to a control unit 2. On the basis of the above information, the control unit 2 computes the amount of heat required for combustion of particulates collected in the filter 10 and applies to a fuel supply device 1 a duty signal for controlling the amount of fuel to be supplied from the fuel supply device 1. Fuel supplied under pressure from a fuel pump 3 is emitted from the fuel supply device 1 toward the filter 10 according to the duty cycle of the duty signal. The emitted fuel is atomized by an air assist whose pressure pulsates at a frequency determined by the rotation speed of an air pump 4 driven by a DC motor 34. The atomized fuel is then ignited by sparks generated from an ignition unit 6 to which a high voltage is applied from an igniter 5 for generating such sparks. Primary air from another air pump 7 is swirled by a swirler 8 to be sufficiently mixed with fuel thereby ensuring complete combustion of the fuel-air mixture. The pure high-temperature gas produced as a result of complete combustion of the fuel-air mixture is supplied to the particulate filter 10 for oxidizing particulates collected in the filter 10.

The structure of the fuel supply device 1 and components in the vicinity of will be described in more detail with reference to FIG. 2. Referring to FIG. 2, a coil 14 is incorporated in the fuel supply device 1, and a plunger 15 capable of making vertical or axial movement in response to the energization of the coil 14 extends through the coil 14. A ball valve member 16 is fixed to the front or upper end of the plunger 15 to normally engage the inner wall surface of a nozzle 17. The ball valve member 16 is disengaged from the inner wall surface of the nozzle 17 when the plunger 15 makes its downward movement in FIG. 2. A port is bored in the side wall of the body of the fuel supply device 1 where the plunger 15 is disposed, so that fuel from the fuel pump 3 can be supplied to the fuel supply device 1 through a fuel pipe 30. The supplied fuel is emitted from the nozzle 17 when the ball valve member 16 is urged to its open position due to the energization of the coil 14. The coil 14 is energized under control of the duty signal applied from the control unit 2.

Figure 3:
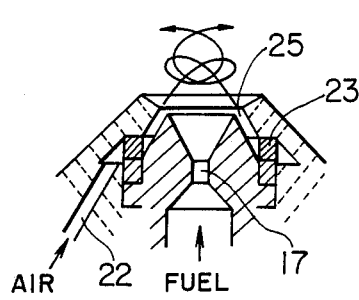
FIG. 3 is an enlarged view of the fuel jet part in FIG. 2.
Figure 4:
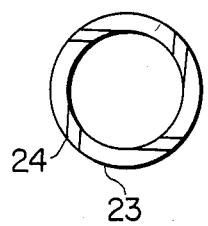
FIG. 4 is a plan view of the swirler tip shown in FIG. 2.

An air assist jet port 25 is formed around the periphery of the upper portion of the nozzle 17. Assisting air from the air pump 4 passes through an air pipe 18 and an air assist passage 22 to be emitted from the air assist jet part 25. The air assist passing through the air assist passage 22 flows out through a swirler tip 23 as shown in FIG. 3. This swirler tip 23 is formed with a plurality of, or for example, four grooves 24 angularly displaced by 90° from each other, as shown in FIG. 4 so that a swirling motion can be imparted to the air assist flowing out along the periphery of the nozzle 17.

The operation of the fuel supply device 1 described above will now be described.

The coil 14 is periodically energized under control of the duty signal applied from the control unit 2 thereby causing vertical movement of the plunger 15. The resultant vertical movement of the ball valve member 16 fixed to the plunger 15 pulsates the supply of fuel fed under pressure from the fuel pump 3. Fuel is emitted from the nozzle 17 in a relation proportional to the on duration of the duty signal. Primary air supplied from the air pump 7 flows through an air pipe 19, and a swirling motion is imparted thereto by the swirler 8. Pulsating assisting air supplied from the air pump 4 flows through the air pipe 18, and a swirling motion is also imparted thereto by the grooves 24 of the swirler tip 23 before it is emitted from the air assist jet port 25. Complete atomization of fuel is achieved by the pulsating assist air emitted from the jet port 25 while making a swirling motion.

Control of the pulsation of jetted fuel and the pulsation of assist air in the fuel supply device 1 having such a structure will now be described.

Figure 5:
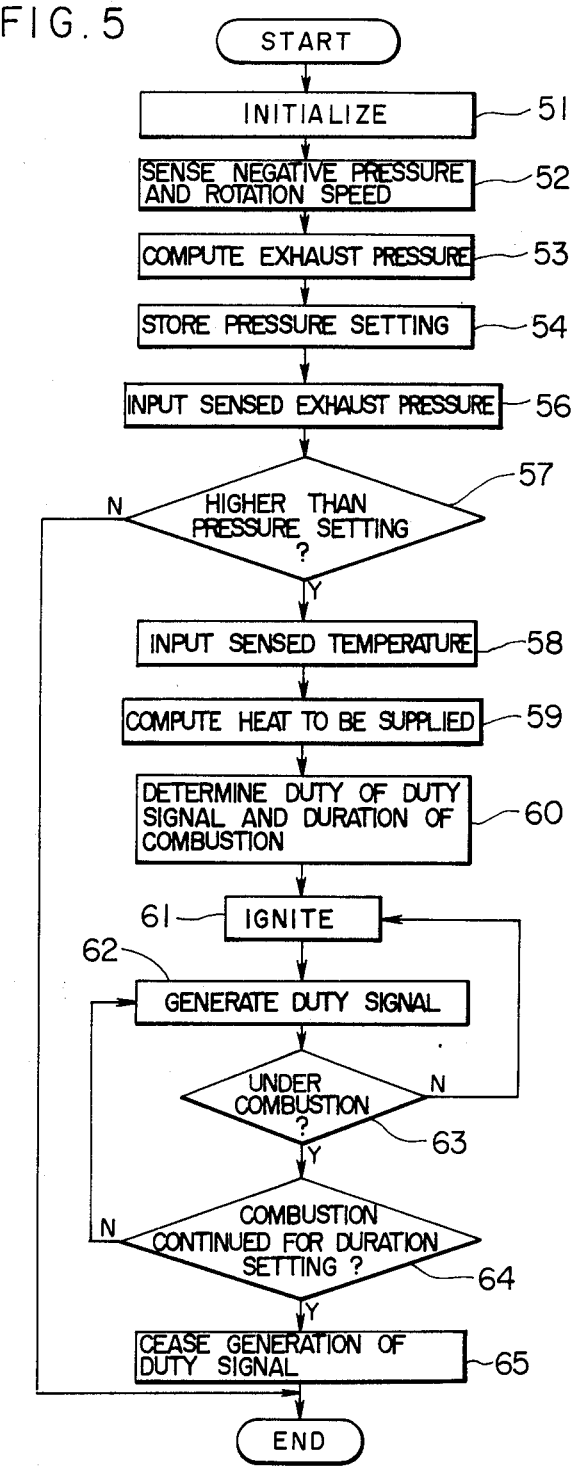
FIG. 5 is a flow chart showing, by way of example, the steps of fuel supply control according to the present invention.

First, control of the pulsation of jetted fuel will be described with reference to FIGS. 1 and 5. A read-only memory (ROM) storing a fuel jet control program is incorporated in the control unit 2, and the program is periodically started at a time interval of a predetermined period unless the control unit 2 is not in operation. In the step 51 in FIG. 5, a random access memory (RAM) storing various data and a temporary storage register are initialized. In the next step 52, data indicative of the sensed negative pressure in the intake manifold and the sensed rotation speed of the engine 9 are applied to the control unit 2, and, in the next step 53, the control unit 2 computes the exhaust pressure on the basis of the above data inputs. This computation is done by retrieving a map which has been previously stored in the ROM and represents the exhaust pressure relative to the manifold negative pressure and engine rotation speed. The data of the exhaust pressure computed in the step 53 is stored as a pressure setting in the register incorporated in the control unit 2. In the step 56, data indicative of the exhaust pressure sensed by the pressure sensor 13 is applied to the control unit 2, and, in the step 57, a determination is made as to whether or not the sensed exhaust pressure is higher than the pressure setting stored in the step 54. When the result of this determination in the step 57 is "NO", this means that clogging of the filter 10 with particulates is not so excessive as to require regeneration by combustion, and the program comes to its end. On the other hand, when the result of the determination in the step 57 is "YES", this means that clogging of the filter 10 with particulates is so excessive as to give rise to a large pressure loss, and the program proceeds to effect combustion of the particulates for the purpose of regeneration. In the step 58, data indicative of the filter temperature sensed by the temperature sensor 12 is applied to the control unit 2, and, in the next step 59, the control unit 2 computes, on the basis of this sensed temperature data and the sensed exhaust pressure data obtained in the step 56, the amount of heat required for attaining the temperature level required for combustion of the particulates. In the step 60, the flow rate of fuel and the duration of combustion required for obtaining the computed amount of heat are determined. As is commonly known in the art, a table or a map empirically prepared is retrieved for the computation of the amount of heat and determination of the flow rate of fuel. Similarly, the duration of combustion is determined on the basis of an empirically prepared table showing the relation between the filter temperature and the regeneration time. The duty factor of the duty signal is determined on the basis of the determined fuel flow rate. Then, in the step 61, the ignition signal is generated and applied to the igniter 5 so that the ignition unit 6 generates an ignition spark. In the step 62, the data of the duty factor computed in the step 60 is stored in the register in the control unit 2 so that a duty signal having a rectangular waveform is generated by a circuit well known in the art. In the step 63, a determination is made as to whether or not the emitted fuel has been ignited, on the basis of the output signal of the flame sensor 11. When the result of this determination in the step 63 is "NO", the step 63 returns to the step 61 in which the igniting operation is repeated. On the other hand, when the result of the determination in the step 63 is "YES", the step 63 proceeds to the step 64 in which a determination is made as to whether or not the combustion has been sustained over the determined duration. When the result of the determination in the step 64 is "NO", the step 64 returns to the step 62 in which the duty signal is continuously generated again to sustain combustion. On the other hand, when the result of the determination in the step 64 is "YES", this means that the regeneration of the filter 10 has been completed, and, in the step 65, generation of the duty signal is terminated, so as to end the program.

The flow rate of fuel is dependent upon both the frequency and the duty pulse width of the duty signal. Therefore, when the duty pulse width of the duty signal is set to be constant, the fuel flow rate or thermal output is proportional to the frequency of the duty signal, and fuel is emitted in the form of an intermittent stream pulsating with the same frequency as that of the duty signal. On the other hand, when the frequency of the duty signal is set to be constant, the fuel flow rate or thermal output is proportional to the duty pulse width of the duty signal. The frequency and duty pulse width of the duty signal can be determined in dependence upon the flow rate of fuel.

Figure 6:
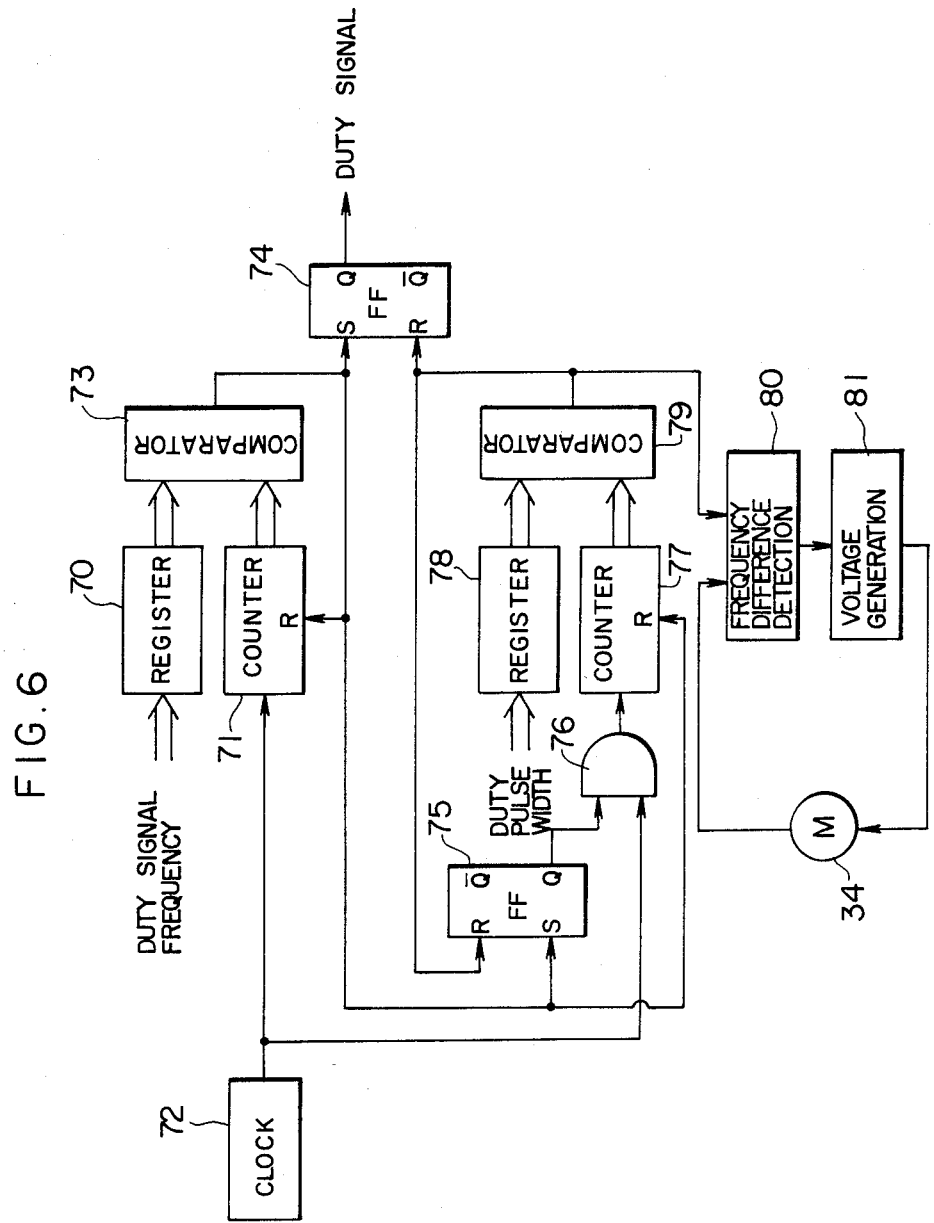
FIG. 6 is a block diagram of one form of the duty signal generating circuit incorporated in the apparatus of the present invention.

FIG. 6 is a block diagram showing the structure of one form of the duty signal generating circuit incorporated in the control unit 2. Referring to FIG. 6, a register 70 stores data representative of the period of the duty signal or corresponding to the frequency of the duty signal. A counter 71 counts clock pulses having a predetermined period and applied from a clock 72. When coincidence is reached between the count of the counter 71 and the data stored in the register 70, the output of a comparator 73 goes high, to set a flip-flop 74, and the Q output of the flip-flop 74 goes high, to define the leading edge of the duty pulse. At the same time, the output of the comparator 73 resets the counter 71, and the counter 71 starts to count the clock pulses again. In this manner, a pulse of the duty signal frequency appears at the output of the comparator 73. This duty frequency pulse sets another flip-flop 75, and the Q output high level from the flip-flop 75 is applied to an AND gate 76 so that the clock pulses from the clock 72 can now pass through the AND gate 76. Another counter 77 is reset in response to the application of the duty frequency pulse from the comparator 73 to count the clock pulses applied through the AND gate 76. Another register 78 stores data corresponding to the pulse width of the duty signal. When coincidence is reached between the count of the counter 77 and the data stored in the register 78, a high level output is produced from another comparator 79. This output of the comparator 79 resets the flip-flops 74 and 75, and the Q outputs of these flip-flops drop to a low level. Therefore, the duty signal having the duty frequency previously set in the register 70 and the duty pulse width previously set in the register 78 is produced at the output terminal Q of the flip-flop 74. The DC motor 34 driving the air pump 4 is shown together with a frequency difference detecting circuit 80 and a voltage generating circuit 81 which will be described later.

Control of the pulsation of an air assist will then be described. This air assist is supplied from a vane type air pump 4, well known in the art. When the vane type air pump 4 has, for example, three vanes, the air assist is pulsated three times per revolution of the vane type air pump 4. Therefore, when the rotation speed of the air pump 4 is 2,000 rpm and 4,000 rpm, the frequency of pulsation of the air assist is 100 Hz and 200 Hz respectively. Thus, a pulsation of the air assist is proportional to the rotation speed of the air pump 4. This air pump 4 is driven by the DC motor 34, and the rotation speed of the DC motor 34 can be controlled by varying its supply voltage. Accordingly, the frequency of pulsation of air assist can be controlled by controlling the voltage supplied to the DC motor 34 by the control unit 2.

Figure 7:
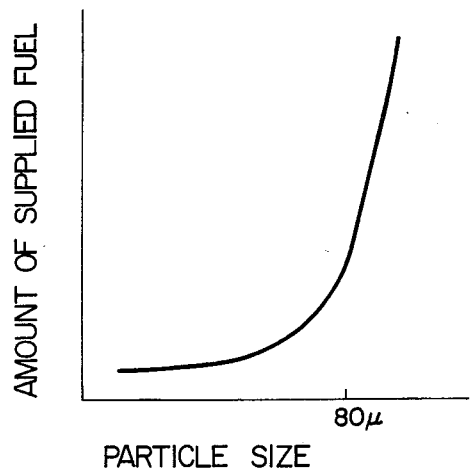
FIGS. 7 to 10 are graphs illustrating the effects of the present invention.
Figure 8:
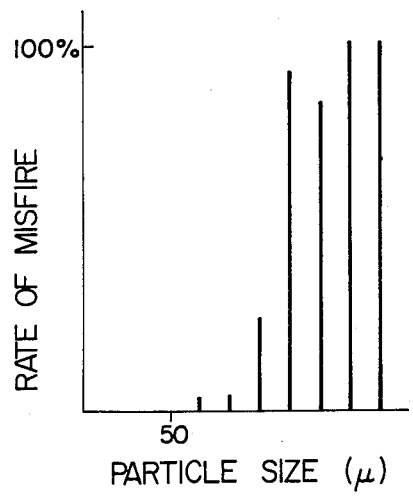

A test was conducted on a Diesel-engine exhaust emission control apparatus having the construction described above, to find the combustibility and ignitability of fuel supplied from the fuel supply device 1. First, the test results showed that the relation between the amount and the particle size of fuel supplied from the fuel supply device 1 was as shown in FIG. 7. It can be seen from the test results shown in FIG. 7 that the amount of supplied fuel should be less than a certain limit in order that the particle size of emitted fuel is smaller than 80 $\mu$. Further, the supplied fuel is generally required to be ignited within a period of time of 2 sec. FIG. 8 shows the test results showing the relation between the fuel particle size and the rate of misfire. It can be seen from the test results shown in FIG. 8 that the fuel particle size should be smaller than 50$\mu$ in order to ensure complete ignition of the fuel.

Figure 9:
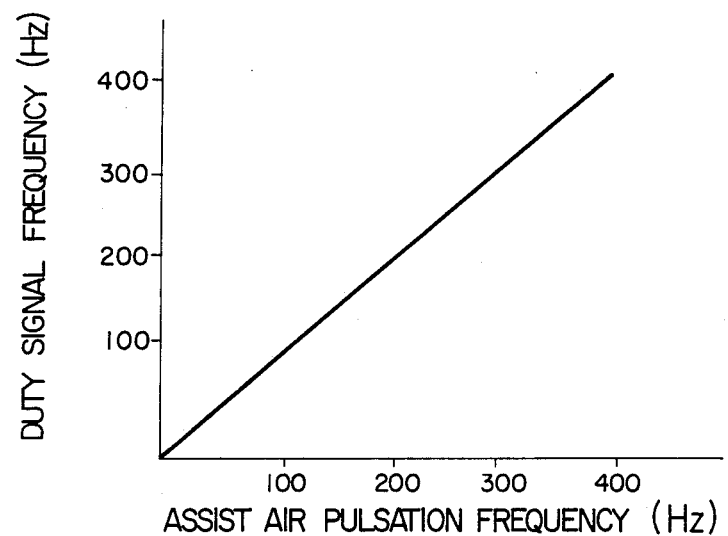
Figure 10:
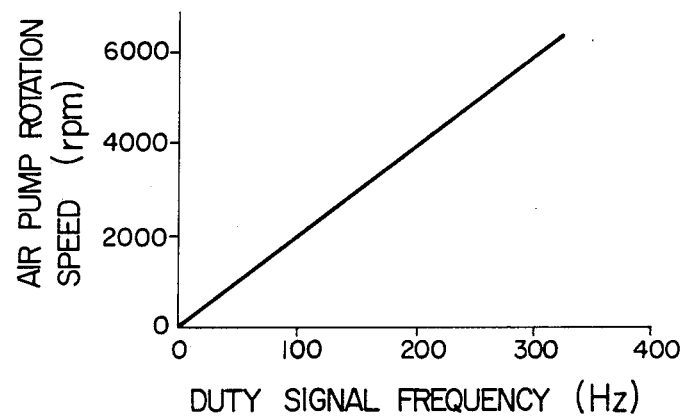

It was experimentally difficult to atomize fuel to less than 50$\mu$ in particle size when fuel was continuously emitted. The inventors have conducted research and studies on this point and found that fuel can be sufficiently and stably atomized effectively by discontinuously emitting the fuel and pulsating the air assist. The inventors have also found that the degree of atomization of fuel can be markedly improved when the frequency of the duty signal applied for emitting of fuel and the pulsation frequency of the air assist are selected to be equal to each other or there is a linear relation therebetween as shown in FIG. 9. FIG. 10 shows the relation between the frequency of the duty signal and the rotation speed of the air pump 4 when the rotation speed of the air pump 4 providing the best combustibility relative to various values of the frequency of the duty signal controlling the fuel supply was experimentally sought and plotted. Since the air pump 4 is of the three vane type, the pulsation frequency of the air assist is 100 Hz and 200 Hz when the rotation speed of the air pump 4 is 2,000 rpm and 4,000 rpm respectively. Thus, as in the case of FIG. 9, the pulsation frequency of assisting air is proportional to the frequency of the duty signal in FIG. 10. That is, the best atomization of fuel is achieved and the best combustibility is also achieved when the pulsation frequency of the air assist and the frequency of the duty signal have the relation shown in FIG. 9. For achieving the above condition, the frequency difference detecting circuit 80 shown in FIG. 6 detects the frequency difference between the output signal of the comparator 79 resetting the flip-flop 74 generating the duty signal and the signal indicative of the rotation speed of the DC motor 34, and, on the basis of the detected frequency difference, the voltage generating circuit 81 shown in FIG. 6 applies a control voltage to the DC motor 34 so that the pulsation frequency of the air assist becomes equal to the frequency of the duty signal.

The above description applies referred to the case where fuel emitted from the fuel supply device 1 is ignited and burned in space to produce high-temperature gas which is introduced into the filter 10 to burn particulates collected by the filter 10 thereby regenerating the filter. In another embodiment of the present invention, the filter 10 has a three-dimensional net structure having a coating of a catalyst, and atomized fuel is directly introduced into such a filter 10 so that fuel is burned in the filter 10 by the function of the catalyst to cause combustion of particulates thereby regenerating the filter 10. In this case, the ignition unit 6 and the flame sensor 11 are unnecessary. In the embodiment using the filter 10 having the catalyst coating also, high-temperature gas produced as a result of combustion of emitted fuel in space may be introduced into the filter.

It will be apparent from the foregoing detailed description that the Diesel-engine exhaust emission control apparatus according to the present invention can sufficiently atomize fuel thereby ensuring complete combustion of fuel.

What is claimed is:

1. For use in an exhaust emission control apparatus for a Diesel engine having a filter collecting particulates contained in exhaust gases of the diesel engine, a fuel supply device for supplying fuel for causing combustion of particulates collected by said filter during a filter regeneration cycle comprising:
    fuel jet means for emitting fuel repeatedly and intermittently from a nozzle toward said filter during a combustion interval prescribed for said filter regeneration cycle;
    air jet port means, disposed adjacent to said nozzle, for atomizing fuel emitted by said fuel jet means;
    air supply means for causing pulsating air to be supplied from said air jet port means during said combustion interval prescribed for said filter regeneration cycle; and control means, coupled to siad fuel jet means, for controlling the repeated and intermittent emission of fuel by said fuel jet means so as to maintain the temperature of said filter at a prescribed level, thereby effecting combustion of particulates collected by said filter during said filter regeneration cycle.

2. A fuel supply device according to claim 1, wherein said control means includes means for controlling said fuel jet means and said air supply means so as to attain equality between the frequency of the repeated and intermittent emission of fuel from said fuel jet means and the frequency of pulsation of air supplied from said air jet port means.

3. A fuel supply device according to claim 1, further comprising a pressure sensor sensing the pressure in an area upstream of said filter.

4. A fuel supply device according to claim 3, wherein said control means includes means for commanding emission of fuel from said fuel jet means by actuating said fuel jet means when the pressure sensed by said pressure sensor exceeds a prescribed limit.

5. A fuel supply device according to claim 4, wherein said fuel emission commanding means includes means for setting said limit on the basis of the manifold negative pressure and rotation speed of the Diesel engine, means for detecting the fact that said sensed pressure exceeds said limit, and means for generating a duty signal determining the fuel emission duty of said feul jet means when said detecting means detects the fact that said sensed pressure exceeds said limit.

6. A fuel supply device according to claim 3, further comprising a temperature sensor sensing the temperature of said filter.

7. A fuel supply device according to claim 6, wherein said control means includes means for setting said fuel emission duty on the basis of the pressure sensed by said pressure sensor and the temperature sensed by said temperature sensor.

8. A fuel supply device according to claim 1, wherein said air jet port means surrounds the fuel emission end of said nozzle.

9. A fuel supply device according to claim 8, wherein said air supply means includes a swirler tip by which air to be supplied from said air jet port means is imparted with a swirling motion around the axis of said nozzle.

10. A fuel supply device according to claim 8, wherein said swirler tip is formed with a plurality of air guide grooves making an angle with respect to the radial direction of the axis of said nozzle.

11. A fuel supply device according to claim 1, further comprising a swirler tip by which the air supplied from a said air supply means is imparted with a swirling motion around the axis of said nozzle.

12. A fuel supply device according to claim 1, wherein said air supply means comprises a vane type air pump.

13. A fuel supply device according to claim 1, wherein said control means includes means for generating a duty signal determining the duration of each repeated and intermittent mission of said fuel, and said fuel jet means includes an electromagnetic valve arranged for opening and closing a fuel passage under control of said duty signal.

* * * * *